(12) United States Patent
Tan

(10) Patent No.: US 11,363,196 B2
(45) Date of Patent: Jun. 14, 2022

(54) IMAGE SELECTION METHOD AND RELATED PRODUCT

(71) Applicant: GUANGDONG OPPO MOBILE TELECOMMUNICATIONS CORP., LTD., Guangdong (CN)

(72) Inventor: Guohui Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 297 days.

(21) Appl. No.: 16/704,915

(22) Filed: Dec. 5, 2019

(65) Prior Publication Data

US 2020/0120278 A1 Apr. 16, 2020

Related U.S. Application Data

(63) Continuation of application No. PCT/CN2018/089976, filed on Jun. 5, 2018.

(30) Foreign Application Priority Data

Jun. 13, 2017 (CN) .......................... 201710443969.X

(51) Int. Cl.
*G06T 5/00* (2006.01)
*H04N 5/232* (2006.01)
(Continued)

(52) U.S. Cl.
CPC ......... *H04N 5/23251* (2013.01); *H04N 5/144* (2013.01); *G06T 5/002* (2013.01); *G06T 7/20* (2013.01)

(58) Field of Classification Search
CPC .............. H04N 5/23251; H04N 5/144; H04N 5/23232; H04N 5/23258; H04N 5/23267;
(Continued)

(56) References Cited

U.S. PATENT DOCUMENTS

| 11,216,923 B2* | 1/2022 | Rahmati | ................. G06T 5/002 |
| 2012/0224072 A1* | 9/2012 | Koo | ...................... G06K 9/325 |
| | | | 348/208.2 |

(Continued)

FOREIGN PATENT DOCUMENTS

| CN | 104065854 A | 9/2014 |
| CN | 104967781 A | 10/2015 |

(Continued)

OTHER PUBLICATIONS

Indian First Examination Report for IN Application 201917052937 dated Mar. 12, 2021. (5 pages).

(Continued)

*Primary Examiner* — Jose L Couso
(74) *Attorney, Agent, or Firm* — Young Basile Hanlon & MacFarlane, P.C.

(57) ABSTRACT

A method for image selection applied to a mobile terminal including a camera may include: acquiring image information of a first image, the image information of the first image comprising a first acceleration value of the mobile terminal in response to the camera capturing the first image, the first image being any one of at least two images successively captured by the camera; and determining that the first image satisfies a multi-frame denoising processing condition in response to the first acceleration value being smaller than a preset acceleration threshold.

14 Claims, 10 Drawing Sheets

---

Image information of a first image of a first image may be acquired by a mobile terminal, the image information of the first image may include a first acceleration value of the mobile terminal in response to a camera capturing the first image, and the first image may be any one of at least two images successively captured by the camera — 001

↓

Whether the first image satisfies a multi-frame denoising processing condition may be determined in response to the first acceleration value being smaller than a preset acceleration threshold — 002

(51) Int. Cl.
*H04N 5/14* (2006.01)
*G06T 7/20* (2017.01)

(58) Field of Classification Search
CPC ............ H04N 5/23238; H04N 5/23264; G06T 5/002; G06T 7/20; G06T 5/50; G06T 5/003; G06T 5/00; G06T 5/009; G06T 5/20; G06T 2207/20182; G06T 2207/20221; G06T 2207/10016; G06T 2207/20016; G06T 2207/20212; G06T 2207/20201; G06T 7/30; G06T 7/33; G06T 7/337; G06T 7/174; G06K 9/6298; G06K 9/4609; G06K 9/40; G06K 9/4661; G06K 9/52; G06K 9/6202; G03B 2207/005; G06V 10/72; G06V 10/443; G06V 10/30; G06V 10/60; G06V 10/42; G06V 10/751; G06V 30/19193

See application file for complete search history.

(56) References Cited

U.S. PATENT DOCUMENTS

| | | | |
|---|---|---|---|
| 2012/0314958 A1 | 12/2012 | Ohwa | |
| 2014/0029837 A1* | 1/2014 | Venkatraman | H04N 5/232133 382/154 |
| 2015/0254870 A1* | 9/2015 | Knibbe | G01S 11/12 345/633 |
| 2015/0324636 A1* | 11/2015 | Bentley | A63F 13/00 386/227 |
| 2016/0048216 A1 | 2/2016 | Fink et al. | |
| 2016/0301871 A1* | 10/2016 | Kuchiki | H04N 5/23254 |
| 2017/0013175 A1 | 1/2017 | Wang et al. | |
| 2018/0324358 A1 | 11/2018 | Yamada et al. | |
| 2019/0334619 A1* | 10/2019 | Aoyama | G06K 9/2054 |

FOREIGN PATENT DOCUMENTS

| | | |
|---|---|---|
| CN | 105391941 A | 3/2016 |
| CN | 105827967 A | 8/2016 |
| CN | 106127698 A | 11/2016 |
| CN | 107205116 A | 9/2017 |
| WO | 2007143415 A2 | 12/2007 |
| WO | 2017090458 A1 | 6/2017 |

OTHER PUBLICATIONS

Communication pursuant to Article 94(3) EPC for EP Application 18817165.6 dated Mar. 18, 2021. (8 pages).
European search report, EP18817165, dated Mar. 25, 2020 (9 pages).
English translation of Second Office Action from China patent office in a counterpart Chinese patent Application 201710443969.X dated May 23, 2019 (19 pages).
English Translation of First Office Action issued in a counterpart Chinese patent Application 201710443969.X, dated Jan. 21, 2019 (10 pages).
English Translation of International search report issued in corresponding international application No. PCT/CN2018/089976, dated Sep. 12, 2018 (3 pages).
Wang et al. Multi-functional noise reduction in functional machine applications, Software, Jun. 30, 2014, pp. 62-64, vol. 35, No. 6 (12 pages).
European Examination Report for EP Application No. 18817165.6, dated Dec. 6, 2021.

* cited by examiner

IMAGE SELECTION METHOD AND RELATED PRODUCT

CROSS-REFERENCE TO RELATED APPLICATION(S)

The present application is a continuation application of International Patent Application No. PCT/CN2018/089976, filed on Jun. 5, 2018, which claims priority to Chinese Patent Application No. 201710443969.X, filed on Jun. 13, 2017, the entire contents of both of which are hereby incorporated by reference in their entireties.

TECHNICAL FIELD

The described embodiments relate to the technical field of image processing, particularly to an image selection method and related products.

BACKGROUND

With the development of technology, digital cameras have become increasingly popular; and mobile terminals, such as smartphones and tablet computers, also have capturing functions. At the time of capturing images, it is customary to process a plurality of captured same images in a multi-frame denoising manner to obtain more image details.

Multi-frame denoising is an image processing technique of performing synthesis processing of a plurality of same images captured and obtaining an image with smaller noises, on the premise that there is a need to successively capture a plurality of same images. However, when a current mobile terminal shoots a picture, it is customary not to use a tripod to fix the shooting. When a user holds the mobile terminal to capture a plurality of images, shake is prone to occur, and the shot object may have a great deviation in the plurality of images, resulting in greater noises of an image synthesized by the mobile terminal via multi-frame denoising processing.

SUMMARY

Embodiments of the present disclosure provide an image selection method and related products, which can rapidly and accurately select images satisfying a multi-frame denoising processing condition.

A first aspect of the embodiments of the present disclosure provides an image selection method applied to a mobile terminal including a camera. The method may include:

acquiring image information of a first image, the image information of the first image comprising a first acceleration value of the mobile terminal in response to the camera capturing the first image, the first image being any one of at least two images successively captured by the camera; and determining that the first image satisfies a multi-frame denoising processing condition in response to the first acceleration value being smaller than a preset acceleration threshold.

A second aspect of the embodiments of the present disclosure provides a mobile terminal including: a camera and an application processor AP. The AP is configured to: acquire image information of a first image, the image information of the first image including a first acceleration value of the mobile terminal in response to the camera capturing the first image, the first image being any one of at least two images successively captured by the camera; and determining that the first image satisfies a multi-frame denoising processing condition in response to the first acceleration value being smaller than a preset acceleration threshold.

A third aspect of the embodiments of the present disclosure provides a computer readable storage medium, the computer readable storage medium is configured to store computer programs for electronic data exchange, the computer programs cause a computer to perform some or all of the operations described in the method according to the first aspect of the embodiments of the present disclosure.

BRIEF DESCRIPTION OF DRAWINGS

In order to more clearly illustrate technical solutions in the embodiments of the present disclosure or the prior art, the drawings required to be used in the embodiments or the description of the prior art will be briefly described below. Obviously, the drawings in the following description are only certain embodiments of the present disclosure, and based on these drawings, other drawings can also be obtained by those ordinarily skilled in the art without any creative work.

DETAILED DESCRIPTION

Figure 1:
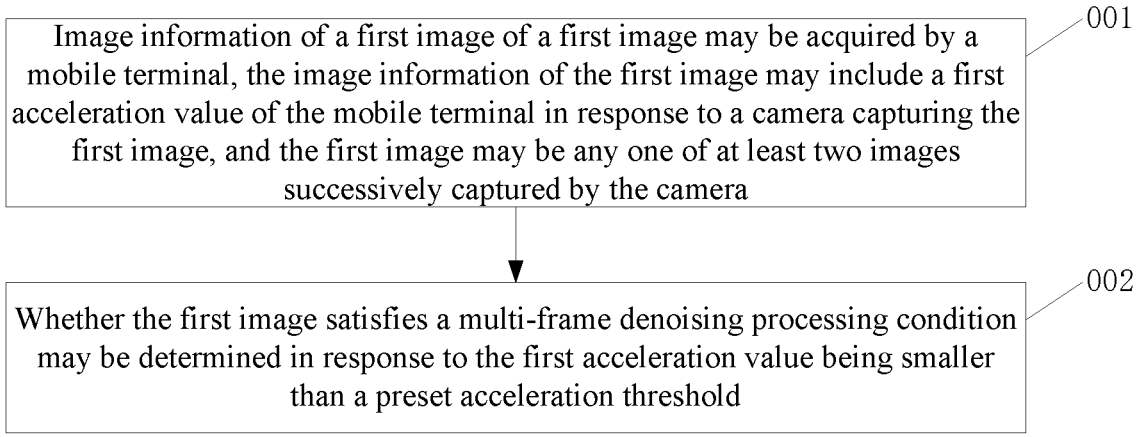
FIG. 1 is a flow chart diagram of an image selection method according to embodiments of the present disclosure.

In order to enable those skill in the art to better understand the solutions of the present disclosure, the technical solutions in the embodiments of the present disclosure will be clearly and completely described in connection with the drawings in the embodiments of the present disclosure. Obviously, the described embodiments are merely parts of the embodiments of the present disclosure, not all embodiments. Based on the embodiments in the present disclosure, all other embodiments can be obtained by those skilled in the art without making any creative work are within the scope of the protection of the present disclosure.

The terms "first", "second" and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

In addition, the mobile terminals involved in the embodiments of the present disclosure may include various handheld devices, vehicle-mounted devices, wearable devices, computing devices, or other processing devices connected to wireless modem, with a wireless communication function, and various forms of User Equipment (UEs), mobile stations (MSs), terminal devices, and the like. For the convenience of description, the devices mentioned above are collectively referred to as mobile terminals.

According to an aspect of the present disclosure an image selection method applied to a mobile terminal including a camera, the method may include: acquiring image information of a first image, the image information of the first image including a first acceleration value of the mobile terminal in response to the camera capturing the first image, the first image being any one of at least two images successively captured by the camera; determining whether the first acceleration value is smaller than a preset acceleration threshold; and determining that the first image satisfies a multi-frame denoising processing condition in response to the first acceleration value being smaller than a preset acceleration threshold.

In some embodiments, the method may include: acquiring image information of a first image, the image information of the first image including a first acceleration value of the mobile terminal in response to the camera capturing the first image, the first image being any one of at least two images successively captured by the camera; and determining that the first image satisfies a multi-frame denoising processing condition in response to the first acceleration value being smaller than a preset acceleration threshold.

In some embodiments, the mobile terminal may further include a gyroscope; and prior to the acquiring image information of the first image, the method may further include: receiving a successive capturing instruction; controlling the camera to successively capture the at least two images in response to the successive capturing instruction; and measuring, via the gyroscope, an acceleration value and an acceleration direction of the mobile terminal in response to the camera successively capturing the at least two images.

In some embodiments, the measuring, via the gyroscope, the acceleration value and the acceleration direction of the mobile terminal in response to the camera successively capturing the at least two images may include: measuring, via the gyroscope, a first acceleration value and a first acceleration direction of the mobile terminal in response to the camera capturing the first image; and the determining whether the first acceleration value is smaller than the preset acceleration threshold may include: determining whether the first acceleration value is smaller than a corresponding preset acceleration threshold of the first acceleration direction.

In some embodiments, the measuring, via the gyroscope, the acceleration value and the acceleration direction of the mobile terminal in response to the camera successively capturing the at least two images may include: measuring, via the gyroscope, a first acceleration value and a first acceleration direction of the mobile terminal in response to the camera capturing the first image.

In some embodiments, subsequent to the determining that the first image satisfies the multi-frame denoising processing condition, the method may further include: performing multi-frame denoising processing on the images satisfying the multi-frame denoising processing condition in the at least two images.

In some embodiments, prior to the performing multi-frame denoising processing on the images satisfying the multi-frame denoising processing condition in the at least two images, the method may further include: determining whether the number of the images satisfying the multi-frame denoising processing condition in the at least two images reaches a preset number; and performing multi-frame denoising processing on the images satisfying the multi-frame denoising processing condition in the at least two images in response to the number of the images satisfying the multi-frame denoising processing condition in the at least two images reaching the preset number.

In some embodiments, prior to the performing multi-frame denoising processing on images satisfying the multi-frame denoising processing condition in the at least two images, the method may further include: determining whether the number of images satisfying the multi-frame denoising processing condition in the at least two images reaches a preset number; and in the performing multi-frame denoising processing on the images satisfying the multi-frame denoising processing condition in the at least two images, the multi-frame denoising processing is performed in response to the number of the images satisfying the multi-frame denoising processing condition in the at least two images reaching the preset number.

In some embodiments, prior to the performing multi-frame denoising processing on the images satisfying the multi-frame denoising processing condition in the at least two images, the method may include: determining whether a same motion region exists in each of the images satisfying the multi-frame denoising processing condition; and in response to the same motion region existing in each of the images satisfying the multi-frame denoising processing condition, the performing multi-frame denoising processing on the images satisfying the multi-frame denoising processing condition in the at least two images may include: performing multi-frame denoising processing on regions other than the motion region in the images satisfying the multi-frame denoising processing condition.

In some embodiments, the preset acceleration thresholds of different acceleration directions are different.

In some embodiments, in response to the first acceleration value being determined to be greater than a preset acceleration threshold, the method may further include outputting prompt information.

According to another aspect, a mobile terminal may be provided. The mobile terminal may include: a camera and an application processor AP, wherein the AP is configured to: acquire image information of a first image, the image information of the first image comprising a first acceleration value of the mobile terminal in response to the camera capturing the first image, the first image being any one of at least two images successively captured by the camera; determine whether the first acceleration value is smaller than a preset acceleration threshold; and determine that the first image satisfies a multi-frame denoising processing condition in response to the first acceleration value is smaller than a preset acceleration threshold.

In some embodiments, The mobile terminal may include: a camera and an application processor AP, wherein the AP is configured to: acquire image information of a first image, the image information of the first image comprising a first acceleration value of the mobile terminal in response to the camera captures the first image, the first image being any one of at least two images successively captured by the camera; and storing the first image for a multi-frame denoising processing in response to the first acceleration value being smaller than a preset acceleration threshold.

In some embodiments, the mobile terminal further comprises a gyroscope; the AP may be further configured to receive a successive capturing instruction; the camera may be further configured to successively capture at least two images in response to the successive capturing instruction; and the gyroscope may be further configured to measure an acceleration value and an acceleration direction of the mobile terminal in response to the camera successively capturing the at least two images.

In some embodiments, that the gyroscope measures an acceleration value and an acceleration direction of the mobile terminal in response to the camera successively capturing the at least two images may further include: the gyroscope may measure a first acceleration value and a first acceleration direction of the mobile terminal in response to the camera capturing the first image; and that the AP determines whether the first acceleration value is smaller than a preset acceleration threshold may further include: the AP may determine whether the first acceleration value is smaller than a corresponding preset acceleration threshold of the first acceleration direction.

In some embodiments, that the gyroscope measures an acceleration value and an acceleration direction of the mobile terminal in response to the camera successively capturing the at least two images may further include: the gyroscope may measure a first acceleration value and a first acceleration direction of the mobile terminal in response to the camera capturing the first image.

In some embodiments, after determining that the first image satisfies the multi-frame denoising processing condition, the AP may be further configured to perform multi-frame denoising processing on images satisfying the multi-frame denoising processing condition in the at least two images.

In some embodiments, after storing the first image for a multi-frame denoising processing, the AP may be further configured to perform multi-frame denoising processing on the stored images.

In some embodiments, the AP may be further configured to: determine whether the number of the images satisfying the multi-frame denoising processing condition in the at least two images reaches a preset number; and perform multi-frame denoising processing on the images satisfying the multi-frame denoising processing condition in the at least two images in response to the number of the images satisfying the multi-frame denoising processing condition in the at least two images reaching the preset number.

In some embodiments, the AP may be further configured to: determine whether the number of the stored images reaches a preset number; and perform multi-frame denoising processing on the stored images in response to the number of the stored images reaching the preset number.

In some embodiments, the AP may be further configured to determine whether a same motion region exists in each of the images satisfying the multi-frame denoising processing condition; and in response to the same motion region existing in each of the images satisfying the multi-frame denoising processing condition, that the PA performs multi-frame denoising processing on the images satisfying the multi-frame denoising processing condition in the at least two images may further include: the AP may perform multi-frame denoising processing on regions other than the motion region in the images satisfying the multi-frame denoising processing condition.

In some embodiments, the AP may be further configured to determine whether a same motion region exists in each of the stored images; and in response to the same motion region exists in each of the stored images that the PA performs multi-frame denoising processing on the stored images may further include the AP may perform multi-frame denoising processing on regions other than the motion region in the images satisfying the multi-frame denoising processing condition.

In some embodiments, the preset acceleration thresholds of different acceleration directions may be different.

In some embodiments, in response to the AP determining that the first acceleration value is greater than a preset acceleration threshold, the AP may be further configured to output prompt information in response to the first acceleration value being greater than a preset acceleration threshold.

According to another aspect, a mobile terminal may be provided, the mobile terminal may include: a camera, an application processor AP, and a memory; the memory may be configured to store one or more programs containing instructions; and the AP may be configured to call the instructions stored in the memory to perform the above method.

According to another aspect, an image selection device applied to a mobile terminal including a camera may be provided, the image selection device may include: an acquiring unit, configured to acquire image information of a first image, the image information of the first image including a first acceleration value of the mobile terminal in response to the camera capturing the first image, the first image being any one of at least two images successively captured by the camera; a first determining unit, configured to determine whether the first acceleration value is smaller than a preset acceleration threshold; and a determination unit, configured to determine that the first image satisfies a multi-frame denoising processing condition in response to the first determining unit determines that the first acceleration value is smaller than a preset acceleration threshold.

In some embodiments, the mobile terminal may further include a gyroscope; and the image selection device may further include a receiving unit and a capturing and measuring unit; the capturing unit may be configured to receive a successive capturing instruction; and the capturing and measuring unit may be configured to control the camera to successively capture at least two images in response to the successive capturing instruction, and to measure, via the gyroscope, an acceleration value and an acceleration direction of the mobile terminal in response to the camera successively capturing the at least two images.

In some embodiments, that the capturing and measuring unit measures, via the gyroscope, an acceleration value and an acceleration direction of the mobile terminal in response to the camera successively capturing the at least two images may further include: the capturing and measuring unit may measure, via the gyroscope, a first acceleration value and a first acceleration direction of the mobile terminal in response to the camera capturing the first image; and that the first determining unit may determine whether the first acceleration value is smaller than a preset acceleration threshold may further include: the first determining unit may determine whether the first acceleration value is smaller than a corresponding preset acceleration threshold of the first acceleration direction.

In some embodiments, the image selection device may further include a processing unit configured to perform multi-frame denoising processing on images satisfying the multi-frame denoising processing condition in the at least two images.

In some embodiments, the first determining unit may be further configured to determine whether the number of images satisfying the multi-frame denoising processing condition in the at least two images reaches a preset number, before the processing unit performs multi-frame denoising processing on the images satisfying the multi-frame denoising processing condition in the at least two images; and the processing unit may be further configured to perform multi-frame denoising processing on the images satisfying the multi-frame denoising processing condition in response to the first determining unit determining that the number of images satisfying the multi-frame denoising processing condition in the at least two images reaches the preset number.

In some embodiments, the image selection device may further include a second determining unit configured to determine whether a same motion region exists in each of the images satisfying the multi-frame denoising processing condition, and in response to the second determining unit determining that a same motion region exists in each of the images satisfying the multi-frame denoising processing condition, that the processing unit performs multi-frame denoising processing of the images satisfying the multi-frame denoising processing condition in the at least two images may include: the processing unit may perform multi-frame denoising processing on regions other than the motion region in the images satisfying the multi-frame denoising processing condition.

According to another aspect, a non-transitory computer readable storage medium storing computer programs for electronic data exchange may be provided, the computer programs may cause a computer to perform the above method.

In some embodiments, the computer programs may cause a computer to perform operations: acquiring image information of a first image, the image information of the first image comprising a first acceleration value of the mobile terminal in response to the camera capturing the first image, the first image being any one of at least two images successively captured by a camera; determining whether the first acceleration value is smaller than a preset acceleration threshold, and whether a same motion region exists in each of the images satisfying the multi-frame denoising processing condition; and in response to the first acceleration value being smaller than the preset acceleration threshold and in response to the same motion region existing in each of the images satisfying the multi-frame denoising processing condition, performing multi-frame denoising processing on regions other than the motion region in the images satisfying the multi-frame denoising processing condition.

In some embodiments, prior to the acquiring image information of the first image, the method may further include receiving a successive capturing instruction; controlling the camera to successively capture the at least two images in response to the successive capturing instruction; and measuring, via a gyroscope, an acceleration value and an acceleration direction of the mobile terminal in response to the camera successively capturing the at least two images.

In some embodiments, the measuring, via the gyroscope, the acceleration value and the acceleration direction of the mobile terminal in response to the camera successively capturing the at least two images may include measuring, via the gyroscope, a first acceleration value and a first acceleration direction of the mobile terminal in response to the camera capturing the first image; and the determining whether the first acceleration value is smaller than the preset acceleration threshold may include determining whether the first acceleration value is smaller than a corresponding preset acceleration threshold of the first acceleration direction.

In some embodiments, prior to the performing multi-frame denoising processing on regions other than the motion region in the images satisfying the multi-frame denoising processing condition, the operation may further include: determining whether the number of images satisfying the multi-frame denoising processing condition in the at least two images reaches a preset number; and in the performing multi-frame denoising processing on regions other than the motion region in the images satisfying the multi-frame denoising processing condition, the multi-frame denoising processing is performed in response to the number of the images satisfying the multi-frame denoising processing condition in the at least two images reaching the preset number.

The embodiments of the present disclosure will be described in detail below.

Reference may be made to FIG. 1, which is a flow chart diagram of an image selection method according to embodiments of the present disclosure. As shown in FIG. 1, the image selection method includes the following actions or operations.

001: Image information of a first image of a first image may be acquired by a mobile terminal, the image information of the first image may include a first acceleration value of the mobile terminal in response to a camera capturing the first image, and the first image may be any one of at least two images successively captured by the camera.

002: Whether the first image satisfies a multi-frame denoising processing condition may be determined in response to the first acceleration value being smaller than a preset acceleration threshold.

Figure 2:
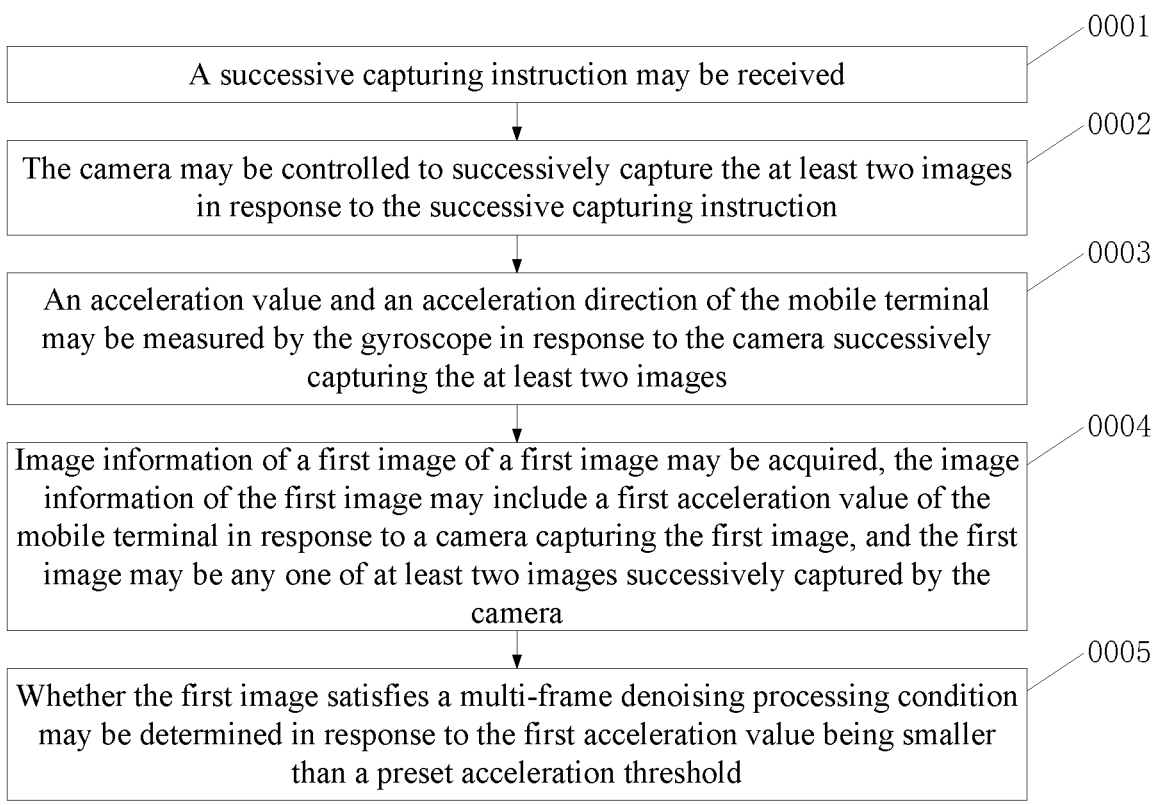
FIG. 2 is another flow chart diagram of an image selection method according to embodiments of the present disclosure.

As shown in FIG. 2, in some embodiments, the image selection method includes the following actions or operations.

0001: A successive capturing instruction may be received.

0002: The camera may be controlled to successively capture the at least two images in response to the successive capturing instruction.

0003: An acceleration value and an acceleration direction of the mobile terminal may be measured by the gyroscope in response to the camera successively capturing the at least two images.

0004: Image information of a first image of a first image may be acquired, the image information of the first image may include a first acceleration value of the mobile terminal in response to a camera capturing the first image, and the first image may be any one of at least two images successively captured by the camera.

0005: Whether the first image satisfies a multi-frame denoising processing condition may be determined in response to the first acceleration value being smaller than a preset acceleration threshold.

Figure 3:
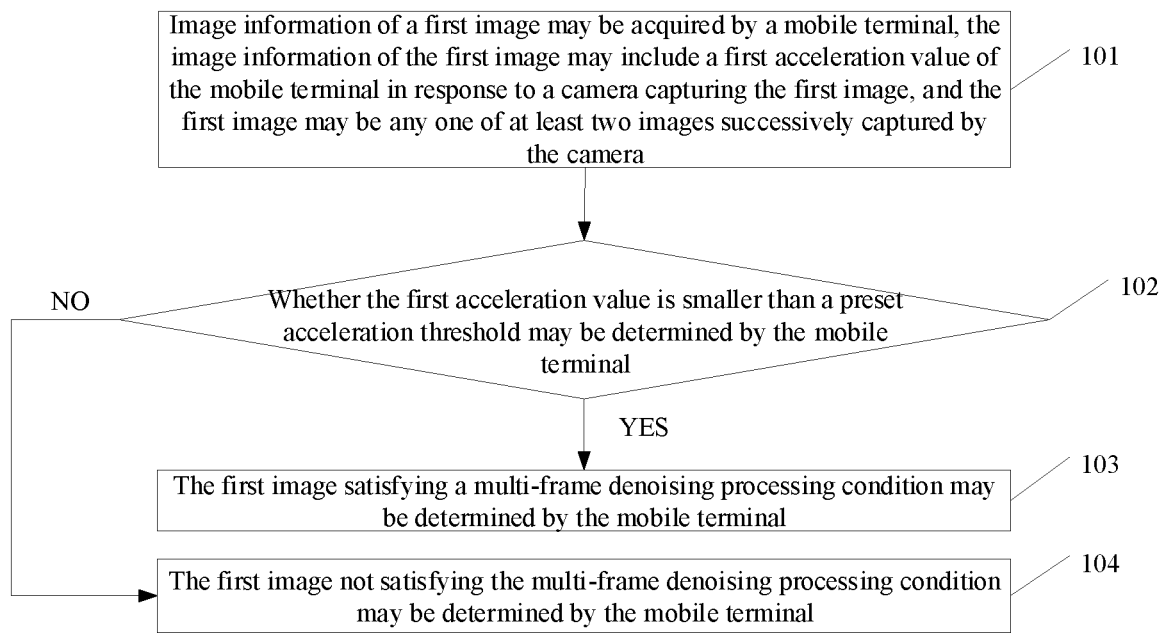
FIG. 3 is a flow chart diagram of an image selection method according to embodiments of the present disclosure.

Reference may be made to FIG. 3, which is a flow chart diagram of an image selection method according to embodiments of the present disclosure. As shown in FIG. 3, the image selection method includes the following actions or operations.

101: Image information of a first image may be acquired by a mobile terminal, the image information of the first image may include a first acceleration value of the mobile terminal in response to a camera capturing the first image, and the first image may be any one of at least two images successively captured by the camera.

In some embodiments of the present disclosure, the mobile terminal may acquire image information of at least two images successively captured by the camera and stored in a memory of the mobile terminal. The mobile terminal may also acquire the image information of the at least two images immediately after the camera successively captures the at least two images. The image information of the first image may include storage space occupied by the first image, capturing time of the first image, an acceleration value of the mobile terminal in response to the camera capturing the first image, and the like. The first image may be any one of the at least two images successively captured by the camera of the mobile terminal. Prior to performing the action 101, the camera may successively capture at least two images, and the mobile terminal may acquire the image information of the at least two images in response to the camera capturing the at least two images. For example, in response to the camera capturing the first image, it may be possible to measure the acceleration value of the mobile terminal via a device such as a gyroscope or an acceleration sensor. The at least two images described above may include a first image, a second image, and the like.

102: Whether the first acceleration value is smaller than a preset acceleration threshold may be determined by the mobile terminal; and if YES, performing action 103, or if NO, performing action 104.

In some embodiments of the present disclosure, the action 102 may be used to determine whether shake occurs in the process of capturing the first image. The preset acceleration threshold may be preset by the mobile terminal and stored in a non-volatile memory of the mobile terminal. For example, the acceleration threshold may be preset to be 1 cm/s$^2$. In response to the first acceleration value of the first image being smaller than 1 cm/s$^2$, the mobile terminal considers that no shake occurs in the process of capturing the first image, and determines that the first image satisfies a multi-frame denoising processing condition. In response to the first acceleration value of the first image being greater than or equal to 1 cm/s$^2$, the mobile terminal considers that shake occurs in the process of capturing the first image, and determines that the first image does not satisfy the multi-frame denoising processing condition. Since the first image is only any one of the above at least two images, all of the at least two images can be determined in the manner of the action 102.

103: The first image satisfying a multi-frame denoising processing condition may be determined by the mobile terminal.

104: The first image not satisfying the multi-frame denoising processing condition may be determined by the mobile terminal.

Multi-frame denoising may be an image processing technique of performing synthesis processing of a plurality of captured same images and obtaining an image with smaller noises, on the premise that there is a need to successively capture a plurality of same images. In response to the mobile terminal initiates a multi-frame denoising function, the camera will successively capture a plurality of images (for example, ten images) in a short time (e.g., within one second) and perform multi-frame denoising processing of the plurality of images successively captured. Since the plurality of images are captured in a short time, the plurality of images are generally considered as same images. However, in the actual capturing process, due to the user's hand shake during the capturing, etc., blurred unclear images are caused to exist in the plurality of images successively captured, thereby resulting in greater noises of an image synthesized via multi-frame denoising processing. Therefore, the image selection method in the embodiment of the present disclosure screens out images satisfying the multi-frame denoising processing condition from the at least two images successively captured by the camera, so as to facilitate performing multi-frame denoising processing of the images satisfying the multi-frame denoising processing condition in the plurality of images successively captured.

The method shown in FIG. 3 is implemented as screening out images satisfying the multi-frame denoising processing condition by determining whether an acceleration value of the mobile terminal at the capturing time of the at least two images successively captured by the camera is smaller than a preset acceleration threshold. The screening algorithm could be so simple that the images satisfying the multi-frame denoising processing condition can be rapidly and accurately selected.

Figure 4:
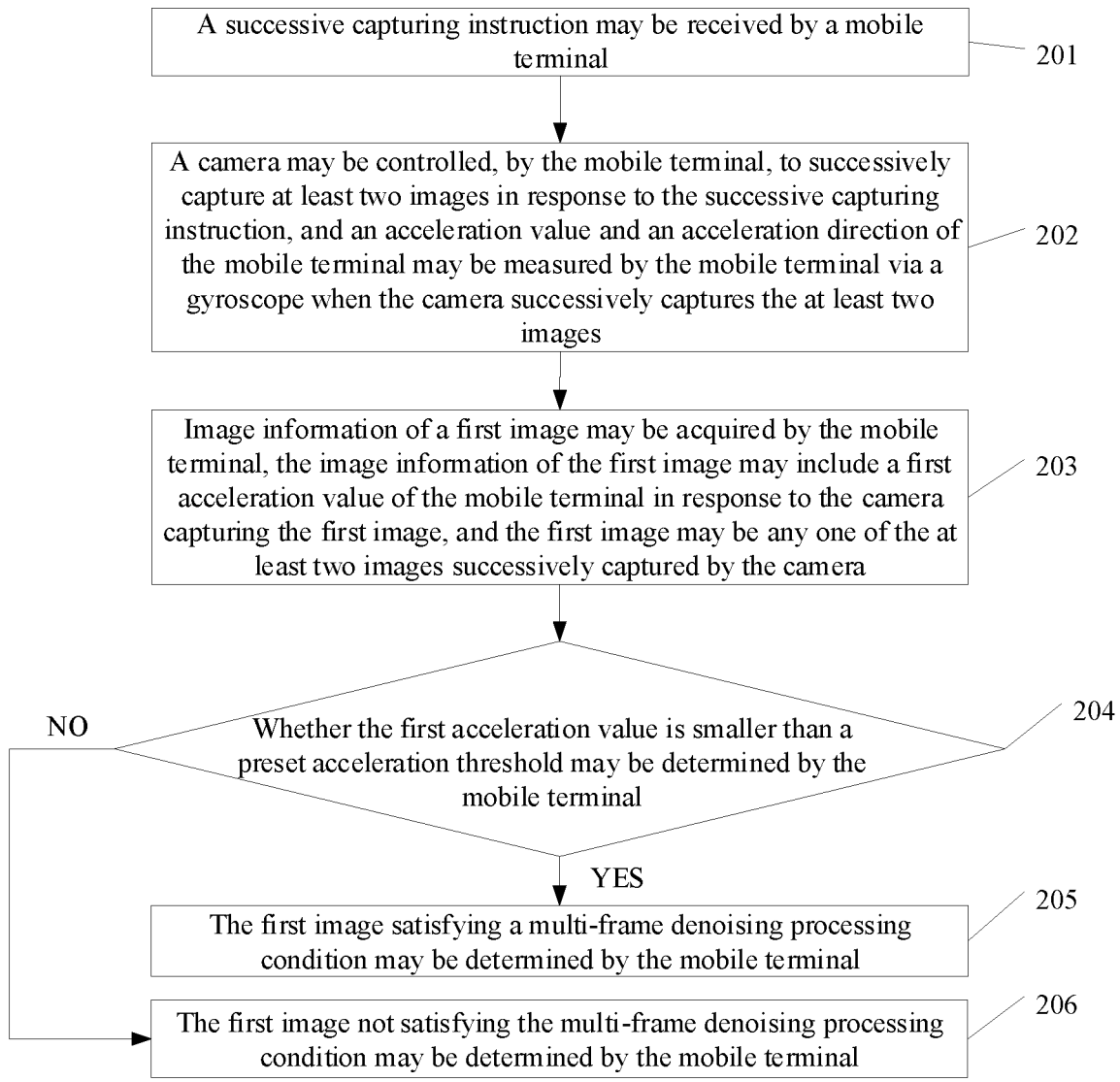
FIG. 4 is a flow chart diagram of another image selection method according to embodiments of the present disclosure.

Reference is made to FIG. 4, which is a flow chart diagram of another image selection method according to an embodiment of the present disclosure. As shown in FIG. 4, the image selection method includes the following actions or operations.

201: A successive capturing instruction may be received by a mobile terminal.

202: A camera may be controlled, by the mobile terminal, to successively capture at least two images in response to the successive capturing instruction, and an acceleration value and an acceleration direction of the mobile terminal may be measured by the mobile terminal via a gyroscope in response to the camera successively capturing the at least two images.

In some embodiments of the present disclosure, the mobile terminal may perform image screening of the at least two images successively captured by the camera to screen out images satisfying a multi-frame denoising processing condition. Image information of the at least two images may be measured via a gyroscope in response to the camera successively capturing the at least two images.

In some embodiments, the action 202 may include:

A first acceleration value and a first acceleration direction of the mobile terminal may be measured by the mobile terminal via a gyroscope in response to the camera capturing a first image.

Specifically, the mobile terminal may measure the first acceleration value and the first acceleration direction of the mobile terminal via the gyroscope when the camera has the shutter turned on. The first acceleration value corresponds to the first acceleration direction, and the first acceleration value of the mobile terminal may be measured by the mobile terminal in the first acceleration direction.

203: Image information of a first image may be acquired by the mobile terminal, the image information of the first image may include a first acceleration value of the mobile terminal in response to the camera capturing the first image, and the first image may be any one of the at least two images successively captured by the camera.

204: Whether the first acceleration value is smaller than a preset acceleration threshold may be determined by the mobile terminal; and if YES, performing action 205, or if NO, performing action 206.

In some embodiments, the action 204 may include:

Whether the first acceleration value is smaller than a corresponding preset acceleration threshold of the first acceleration direction may be determined by the mobile terminal.

In the embodiment of the present invention, different acceleration directions may correspond to different preset acceleration thresholds. In response to the user holds the mobile terminal for capturing, shake in different directions exerts different noise impacts on the captured images. For example, relatively small shake of the mobile terminal in a direction adjacent to an object to be shot or in a direction away from the object to be shot may have a great noise impact on the effect of the captured image, and shake of the mobile terminal occurring in a direction substantially perpendicular to the direction adjacent to the object to be shot has a rather small noise impact on the effect of the captured image. Therefore, in response to the camera capturing an image, the acceleration direction of the mobile terminal during the image capturing and the acceleration value in the acceleration direction are simultaneously measured via the gyroscope, so as to facilitate subsequently determining whether violent shake occurs during the image capturing according to the acceleration value in the acceleration direction. In some embodiments of the present disclosure, by configuring different preset acceleration thresholds in different acceleration directions and configuring different acceleration thresholds according to different shake directions of the mobile terminal (i.e., acceleration directions of the mobile terminal) given different impact of directions of shake of the mobile terminal at the time of the image capturing on the capturing quality, it may be possible to screen out images having rather small noise values and satisfying the multi-frame denoising processing condition in different shake directions according to a relatively uniform standard, which could further improve accuracy of the image screening.

205: The first image satisfying a multi-frame denoising processing condition may be determined by the mobile terminal.

206: The first image not satisfying the multi-frame denoising processing condition may be determined by the mobile terminal.

For the actions 203 to 206 in embodiments of the present disclosure, reference may be made to the actions 101 to 104 shown in FIG. 3, and details are not described herein again.

The method shown in FIG. 4 may be implemented as screening out images satisfying the multi-frame denoising processing condition by determining whether the acceleration value of the mobile terminal at the capturing time of the at least two images successively captured by the camera is smaller than a preset acceleration threshold. The screening algorithm could be so simple that the images satisfying the multi-frame denoising processing condition could be rapidly and accurately selected.

Figure 5:
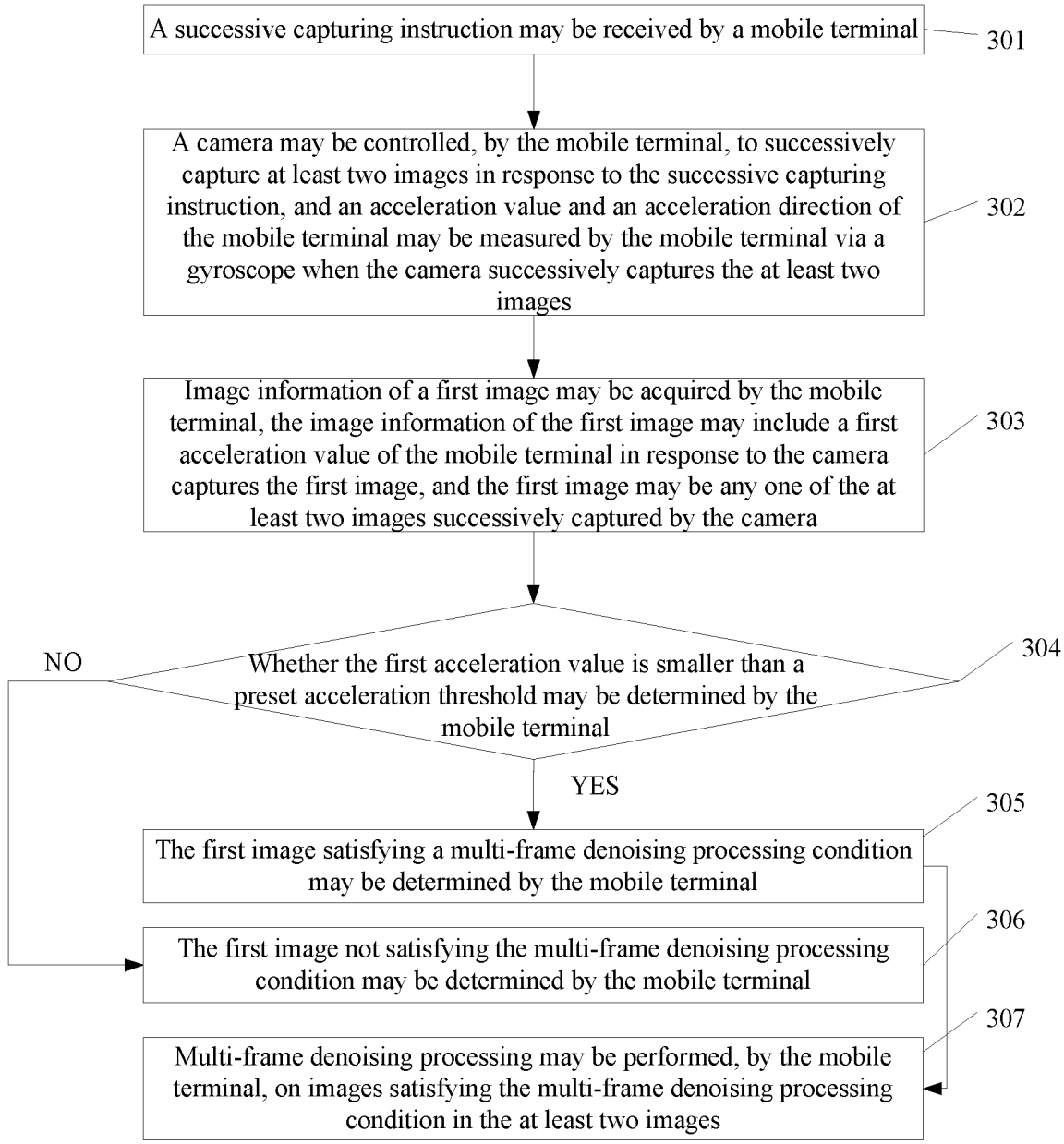
FIG. 5 is a flow chart diagram of another image selection method according to embodiments of the present disclosure.

Reference is made to FIG. 5, which is a flow chart diagram of another image selection method according to an embodiment of the present disclosure. As shown in FIG. 5, the image selection method may include the following actions or operations.

301: A successive capturing instruction may be received by a mobile terminal.

302: A camera may be controlled, by the mobile terminal, to successively capture at least two images in response to the successive capturing instruction, and an acceleration value and an acceleration direction of the mobile terminal may be measured by the mobile terminal via a gyroscope in response to the camera successively capturing the at least two images.

303: Image information of a first image may be acquired by the mobile terminal, the image information of the first image may include a first acceleration value of the mobile terminal in response to the camera captures the first image, and the first image may be any one of the at least two images successively captured by the camera.

304: Whether the first acceleration value is smaller than a preset acceleration threshold may be determined by the mobile terminal; and if YES, performing action 305, or if NO, performing action 306.

305: The first image satisfying a multi-frame denoising processing condition may be determined by the mobile terminal.

306: The first image not satisfying the multi-frame denoising processing condition may be determined by the mobile terminal.

307: Multi-frame denoising processing may be performed, by the mobile terminal, on images satisfying the multi-frame denoising processing condition in the at least two images.

In embodiments of the present disclosure, after the action 305 is performed, the action 307 may also be performed. The image selection method in embodiments of the present disclosure may be to screen out images satisfying the multi-frame denoising processing condition from the plurality of images successively captured by the camera to perform multi-frame denoising processing.

For the actions 301 to 306 in embodiments of the present disclosure, reference may be made to the actions 201 to 206 shown in FIG. 3, and details are not described herein again.

The method shown in FIG. 5 is implemented as screening out images satisfying the multi-frame denoising processing condition by determining whether the acceleration value of the mobile terminal at the capturing time of the at least two images successively captured by the camera is smaller than a preset acceleration threshold, and performing multi-frame denoising processing on the images satisfying the multi-frame denoising processing condition in the at least two images. The screening algorithm in the embodiment of the present disclosure may be so simple that the images satisfying the multi-frame denoising processing condition can be rapidly and accurately selected, thereby reducing noises of an image synthesized via multi-frame denoising processing and improving display effect of the image synthesized via the multi-frame denoising processing.

Figure 6:
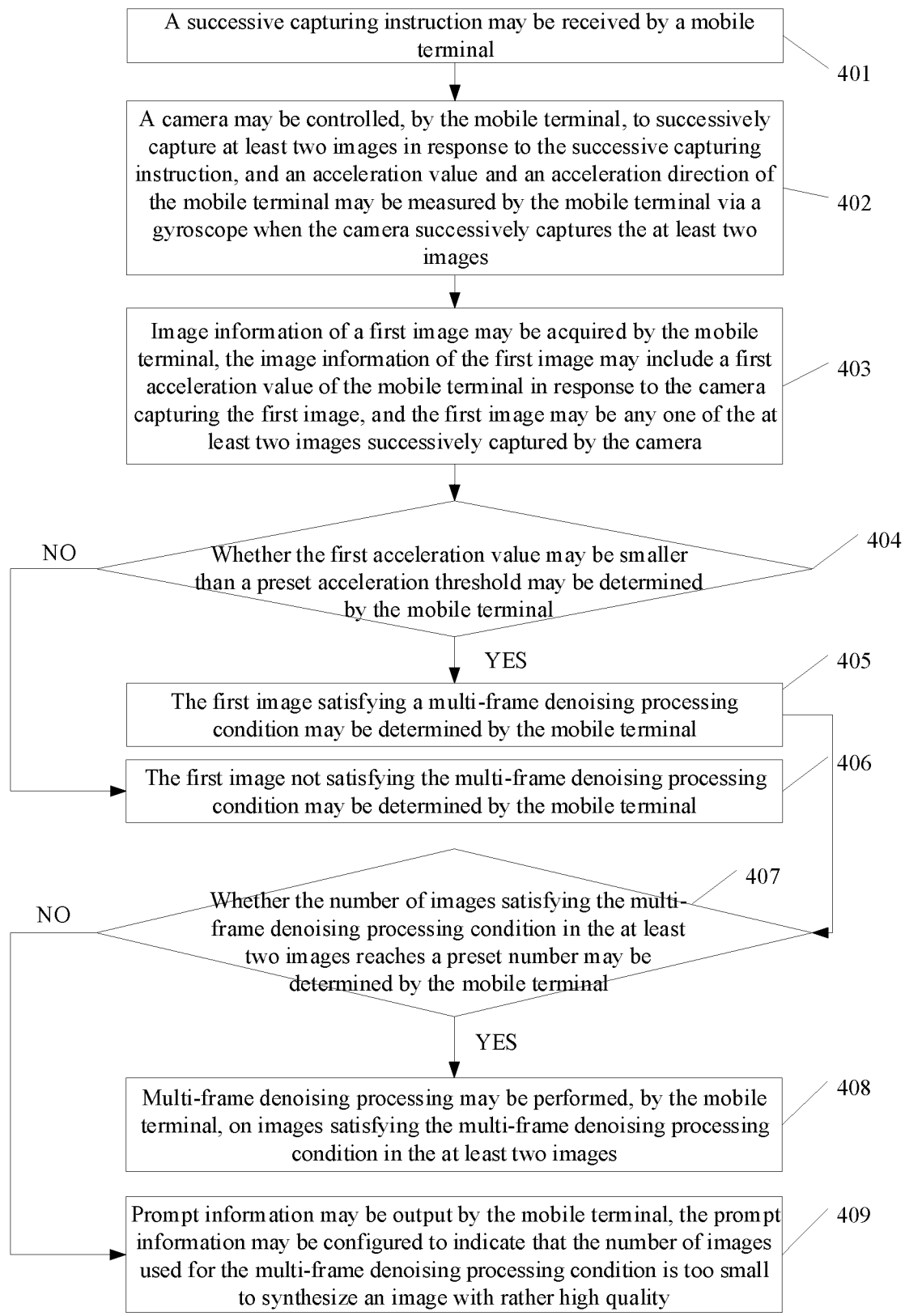
FIG. 6 is a flow chart diagram of another image selection method according to embodiments of the present disclosure.

Reference is made to FIG. 6, which is a flow chart diagram of another image selection method according to an embodiment of the present disclosure. As shown in FIG. 6, the image selection method includes the following actions or operations.

401: A successive capturing instruction may be received by a mobile terminal.

402: A camera may be controlled, by the mobile terminal, to successively capture at least two images in response to the successive capturing instruction, and an acceleration value and an acceleration direction of the mobile terminal may be measured by the mobile terminal via a gyroscope in response to the camera successively capturing the at least two images.

403: Image information of a first image may be acquired by the mobile terminal, the image information of the first image may include a first acceleration value of the mobile terminal in response to the camera capturing the first image, and the first image may be any one of the at least two images successively captured by the camera.

404: Whether the first acceleration value may be smaller than a preset acceleration threshold may be determined by the mobile terminal; and if YES, performing action 405, or if NO, performing action 406.

405: The first image satisfying a multi-frame denoising processing condition may be determined by the mobile terminal.

406: The first image not satisfying the multi-frame denoising processing condition may be determined by the mobile terminal.

407: Whether the number of images satisfying the multi-frame denoising processing condition in the at least two images reaches a preset number may be determined by the mobile terminal; and if YES, performing action 408, or if NO, performing action 409.

After the step 405 may be performed, the step 407 could also be performed.

408: Multi-frame denoising processing may be performed, by the mobile terminal, on images satisfying the multi-frame denoising processing condition in the at least two images.

409: Prompt information may be output by the mobile terminal, the prompt information may be configured to indicate that the number of images used for the multi-frame denoising processing condition is too small to synthesize an image with rather high quality.

In embodiments of the present disclosure, the effect of the image synthesized via the multi-frame denoising processing is related to the number of images used for the multi-frame denoising processing. In general, the more the number of images for the multi-frame denoising processing is, the lower the noise of the image synthesized via the multi-frame denoising processing may be, and the better the effect may be. If the number of images used for the multi-frame denoising processing is too small, the effect of the image synthesized via the multi-frame denoising processing can hardly achieve a desired effect. The preset number in the embodiment of the present disclosure may be set as a number of 2, 3, 4, 5, or the like. In general, in order to synthesize an image with less noise via the multi-frame denoising processing, four or more images are required for the multi-frame denoising processing, so the preset number can be set as 4.

The image selection method in embodiments of the present disclosure is to screen out images satisfying the multi-frame denoising processing condition from the plurality of images successively captured by the camera to perform multi-frame denoising processing.

For the actions 401 to 406 in embodiments of the present disclosure, reference may be made to the actions 201 to 206 shown in FIG. 3, and details are not described herein again.

The method shown in FIG. 6 is implemented as screening out images satisfying the multi-frame denoising processing condition by determining whether the acceleration value of the mobile terminal at the capturing time of the at least two images successively captured by the camera is smaller than a preset acceleration threshold, and performing multi-frame denoising processing of the images satisfying the multi-frame denoising processing condition in the at least two images. The screening algorithm in the embodiment of the present disclosure is so simple that a preset number of images satisfying the multi-frame denoising processing condition can be rapidly and accurately selected, which can further reduce noise of an image synthesized via multi-frame denoising processing and improve the display effect of the image synthesized via the multi-frame denoising processing.

Figure 7:
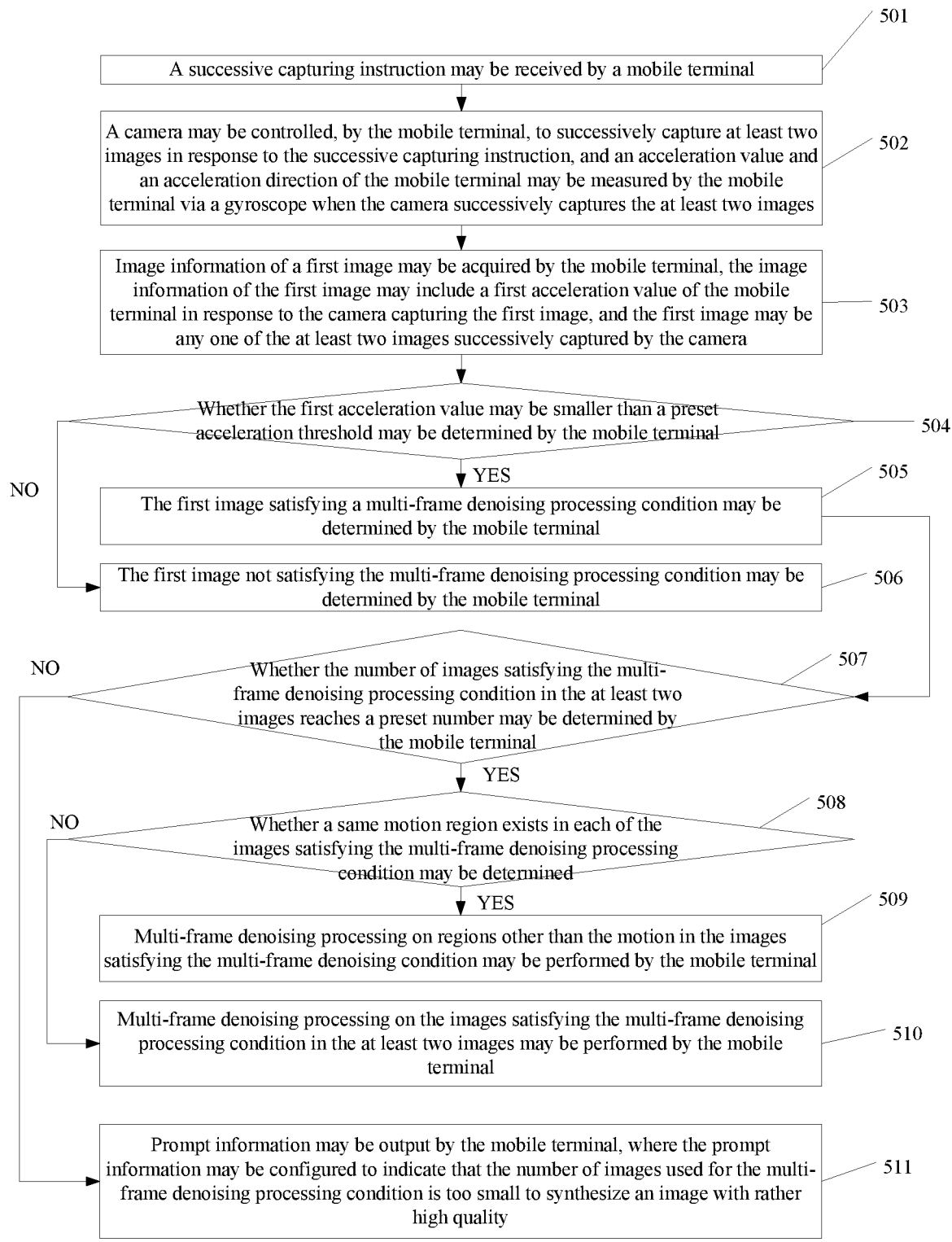
FIG. 7 is a flow chart diagram of another image selection method according to embodiments of the present disclosure.

Reference is made to FIG. 7, which is a flow diagram of another image selection method according to an embodiment of the present disclosure. As shown in FIG. 7, the image selection method includes the following actions.

501: A successive capturing instruction may be received by a mobile terminal.

502: A camera may be controlled, by the mobile terminal, to successively capture at least two images in response to the successive capturing instruction, and an acceleration value and an acceleration direction of the mobile terminal may be measured by the mobile terminal via a gyroscope in response to the camera successively capturing the at least two images.

503: Image information of a first image may be acquired by the mobile terminal, the image information of the first image may include a first acceleration value of the mobile terminal in response to the camera capturing the first image, and the first image may be any one of the at least two images successively captured by the camera.

504: Whether the first acceleration value may be smaller than a preset acceleration threshold may be determined by the mobile terminal; and if YES, performing action 505, or if NO, performing action 506.

505: The first image satisfying a multi-frame denoising processing condition may be determined by the mobile terminal.

506: The first image not satisfying the multi-frame denoising processing condition may be determined by the mobile terminal.

507: Whether the number of images satisfying the multi-frame denoising processing condition in the at least two images reaches a preset number may be determined by the mobile terminal; and if YES, performing action 508, or if NO, performing action 511.

After the action 505 may be performed, the action 507 could also be performed.

508: Whether a same motion region exists in each of the images satisfying the multi-frame denoising processing condition may be determined; and if YES, performing action 509, or if NO, performing action 510.

509: Multi-frame denoising processing on regions other than the motion in the images satisfying the multi-frame denoising condition may be performed by the mobile terminal.

510: Multi-frame denoising processing on the images satisfying the multi-frame denoising processing condition in the at least two images may be performed by the mobile terminal.

511: Prompt information may be output by the mobile terminal, where the prompt information may be configured to indicate that the number of images used for the multi-frame denoising processing condition is too small to synthesize an image with rather high quality.

Figure 8:
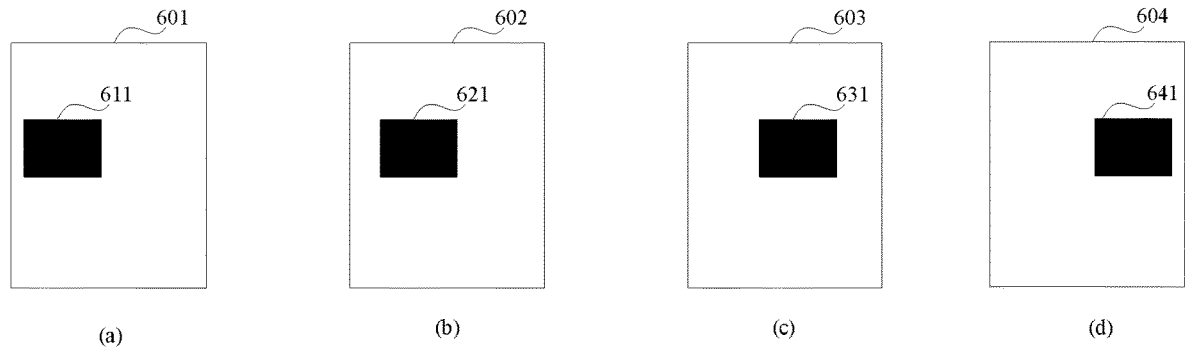
FIG. 8 is a schematic diagram of a plurality of images with multi-frame denoising according to embodiments of the present disclosure.

In embodiments of the present disclosure, the same motion region can be understood as follows: a same object in motion may be present in the plurality of images satisfying the multi-frame denoising processing condition, the same object in motion has different positions in each of the images satisfying the multi-frame denoising processing condition, and thus, a region occupied by the same object in motion in each of the images satisfying the multi-frame denoising processing condition may be defined as the same motion region. For example, referring to FIG. 8, (a), (b), (c), and (d) in FIG. 8 are four images satisfying a multi-frame denoising processing condition. A same object may be shot in each of a region 611 in the image (a), a region 621 in the image (b), a region 631 in the image (c) and a region 641 in the image (d). Since the same object is in constant motion in the camera's successive capturing process, the same object has different positions in each of the images. For example, in the image (a), the region 611 is on the left side of the image (a), while in the image (d), the region 641 is on the right side of the image (d). If multi-frame denoising processing is performed on a multi-frame image of an object in motion which is shot (that is, a same motion region occurs in images satisfying multi-frame denoising processing), trailing smear occurs in a region where the object in motion is displayed, which will instead reduce the image synthesis effect. The embodiment of the present disclosure does not perform multi-frame denoising processing of the same motion region (i.e., the region where the object in motion is displayed during the shooting), thereby making it possible to improve the effect of image synthesis via the multi-frame denoising processing.

The image selection method in embodiments of the present disclosure is to screen out images satisfying the multi-frame denoising processing condition from the plurality of images successively captured by the camera to perform multi-frame denoising processing.

For the actions 501 to 506 in the embodiment of the present disclosure, reference may be made to the actions 201 to 206 shown in FIG. 3, and details are not described herein again.

The method shown in FIG. 7 is implemented as screening out images satisfying the multi-frame denoising processing condition by determining whether the acceleration value of the mobile terminal at the capturing time of the at least two images successively captured by the camera is smaller than a preset acceleration threshold, and performing multi-frame denoising processing of the images satisfying the multi-frame denoising processing condition in the at least two images. The screening algorithm in the embodiment of the present disclosure may be so simple that a preset number of images satisfying the multi-frame denoising processing condition can be rapidly and accurately selected, which can further reduce noise of an image synthesized via multi-frame denoising processing and improve the display effect of the image synthesized via the multi-frame denoising processing. In addition, embodiments of the present disclosure do not perform multi-frame denoising processing of the same motion region (i.e., the region where the object in motion is displayed during the shooting) occurring in the images satisfying the multi-frame denoising processing, thereby making it possible to improve the effect of image synthesis via the multi-frame denoising processing.

The above description mainly introduces the solutions of the embodiments of the present disclosure from the perspective of the method side execution process. It can be understood that, in order to implement the above functions, the mobile terminal includes corresponding hardware structures and/or software modules for performing various functions. Those skilled in the art should readily appreciate that the present disclosure can be implemented in the form of hardware or a combination of hardware and computer software in conjunction with units and algorithm steps of the various examples described in the embodiments disclosed herein. Whether a function is implemented in a manner of hardware or in a manner of driving hardware with computer software depends on specific application and design constraint conditions of the technical solution. A person skilled in the art can adopt different methods for each specific application to implement the described functions, but such implementation should not be considered as exceeding the scope of the present disclosure.

The embodiments of the present disclosure may divide the mobile terminal into functional units according to the foregoing method examples. For example, the respective functional units may be divided to correspond to the respective functions, or two or more functions may be integrated in a processing unit. The above integrated unit can be implemented in the form of hardware or in the form of a software functional unit. It should be noted that the division of the units in the embodiments of the present disclosure may be examples, and may be only a logical function division; and in actual implementation, other division manner may be possible.

Figure 9:
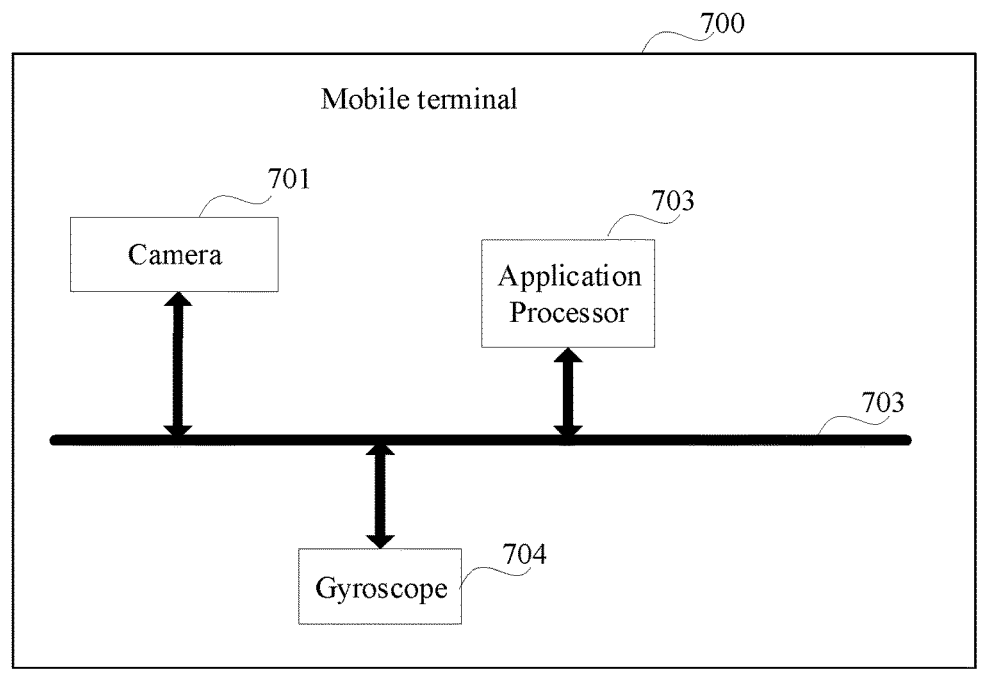
FIG. 9 is a structural diagram of a mobile terminal according to embodiments of the present disclosure.

Reference is made to FIG. 9, which is a structural diagram of a mobile terminal according to an embodiment of the present disclosure. As shown in FIG. 9, the mobile terminal 700 may include a camera 701 and an application processor (AP) 702. The camera 701 and the application processor (AP) 702 can be connected via a bus 703.

The AP 702 may be configured to acquire image information of a first image, where the image information of the first image may include a first acceleration value of the mobile terminal 700 in response to the camera 701 capturing the first image, and the first image may be any one of at least two images successively captured by the camera 701.

The AP 702 may be further configured to determine whether the first acceleration value is smaller than a preset acceleration threshold.

The AP 702 may be further configured to determine that the first image satisfies a multi-frame denoising processing condition in response to the first acceleration value being smaller than the preset acceleration threshold.

Optionally, as shown in FIG. 9, the mobile terminal 700 may further include a gyroscope 704.

The AP 702 may be further configured to receive a successive capturing instruction.

The camera 701 may be further configured to successively capture at least two images in response to the successive capturing instruction.

The gyroscope 704 may be further configured to measure an acceleration value and an acceleration direction of the mobile terminal 700 in response to the camera successively capturing the at least two images.

Optionally, that the gyroscope 704 measures the acceleration value and the acceleration direction of the mobile terminal 700 in response to the camera 701 successively capturing the at least two images may include:

The gyroscope 704 measures the first acceleration value and the first acceleration direction of the mobile terminal 700 in response to the camera 701 capturing the first image.

That the AP 702 determines whether the first acceleration value may be smaller than the preset acceleration threshold may include:

The AP 702 determines whether the first acceleration value is smaller than a corresponding preset acceleration threshold of the first acceleration direction.

Optionally, the AP 702 may be further configured to perform multi-frame denoising processing on images satisfying the multi-frame denoising processing condition in the at least two images after determining that the first image satisfies the multi-frame denoising processing condition.

Optionally, the AP 702 may be further configured to determine whether the number of images satisfying the multi-frame denoising processing condition in the at least two images reaches a preset number.

The AP 702 may be further configured to perform multi-frame denoising processing on images satisfying the multi-frame denoising processing condition in the at least two images in response to the number of images satisfying the multi-frame denoising processing condition in the at least two images reaching the preset number.

Optionally, the AP 702 may be further configured to determine whether a same motion region exists in each of the images satisfying the multi-frame denoising processing condition.

If the same motion region exists in each of the images satisfying the multi-frame denoising processing condition, the AP 702 performs multi-frame denoising processing of images satisfying the multi-frame denoising processing condition in the at least two images, which may include:

The AP 702 may perform multi-frame denoising processing on regions other than the motion region in the images satisfying the multi-frame denoising processing condition.

The mobile terminal shown in FIG. 9 is implemented. The mobile terminal screens images satisfying the multi-frame denoising processing condition by determining whether the acceleration value of the mobile terminal at the capturing time of the at least two images successively captured by the camera is smaller than a preset acceleration threshold. The screening algorithm could be so simple that the images satisfying the multi-frame denoising processing condition can be rapidly and accurately selected.

Figure 10:
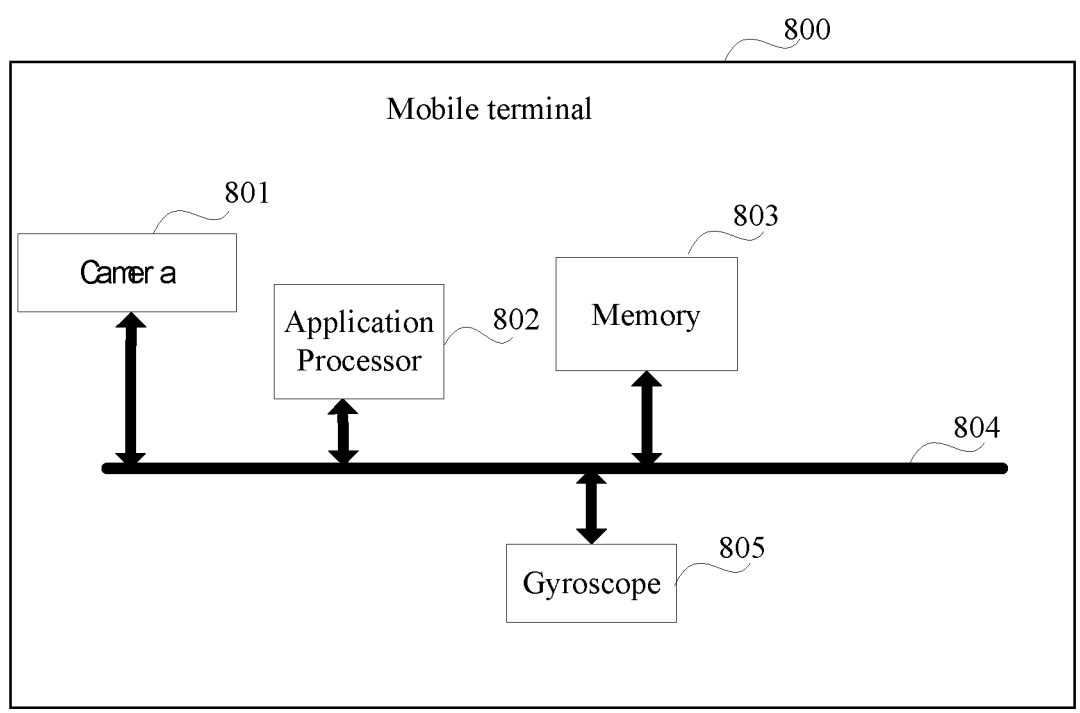
FIG. 10 is a structural diagram of another mobile terminal according to embodiments of the present disclosure.

Reference is made to FIG. 10, which is a structural diagram of another mobile terminal according to an embodiment of the present disclosure. As shown in FIG. 10, the mobile terminal 800 may include a camera 801, an application processor (AP) 802, and a memory 803. Therein, the mobile terminal 800 may further include a bus 804. The camera 801, the application processor (AP) 802, and the memory 803 can be connected to each other via the bus 804. The bus 804 may be a Peripheral Component Interconnect (PCI) bus or an Extended Industry Standard Architecture (EISA) bus. The bus 804 can be divided into an address bus, a data bus, a control bus, and the like. In order to facilitate representation, only a thick line is used to represent the bus in FIG. 10, but it does not mean that there is only one bus or one type of bus.

The memory 803 may be configured to store one or more programs containing instructions.

The AP 802 may be configured to call the instructions stored in the memory 803 to perform the following operations:

Image information of a first image may be acquired, the image information of the first image may include a first acceleration value of the mobile terminal 800 in response to the camera 801 capturing the first image, and the first image may be any one of at least two images successively captured by the camera 801.

Whether the first acceleration value is smaller than a preset acceleration threshold may be determined.

If YES, the first image satisfies a multi-frame denoising processing condition may be determined.

Optionally, the mobile terminal 800 may further include a gyroscope 805. Prior to the AP 802 acquires the image information of the first image, the AP 802 may be further configured to:

Receive a successive capturing instruction, control the camera 801 to successively capture at least two images in response to the successive capturing instruction, and measure an acceleration value and an acceleration direction of the mobile terminal 800 via the gyroscope 805 in response to the camera 801 successively capturing the at least two images.

Optionally, that the AP 802 measures the acceleration value and the acceleration direction of the mobile terminal 800 via the gyroscope 805 in response to the camera 801 successively captures the at least two images may include:

The first acceleration value and the first acceleration direction of the mobile terminal 800 may be measured via the gyroscope 805 in response to the camera 801 capturing the first image.

That whether the first acceleration value is smaller than a preset acceleration threshold is determined may include:

Whether the first acceleration value is smaller than a corresponding preset acceleration threshold of the first acceleration direction may be determined.

Optionally, after determining that the first image satisfies the multi-frame denoising processing condition, the AP 802 may be further configured to:

Perform multi-frame denoising processing on images satisfying the multi-frame denoising processing condition in the at least two images.

Optionally, before performing multi-frame denoising processing on the images satisfying the multi-frame denoising processing condition in the at least two images, the AP 802 may be further configured to:

Determine whether the number of images satisfying the multi-frame denoising processing condition in the at least two images reaches a preset number; and In response to the number of images satisfying the multi-frame denoising processing condition in the at least two images reaching a preset number, perform multi-frame denoising processing of the images satisfying the multi-frame denoising processing condition in the at least two images.

Optionally, before performing multi-frame denoising processing on the images satisfying the multi-frame denoising processing condition in the at least two images, the AP 802 may be further configured to:

Determine whether a same motion region exists in each of the images satisfying the multi-frame denoising processing condition; and If the same motion area exists in each of the images satisfying the multi-frame denoising processing condition, perform multi-frame denoising processing on the images satisfying the multi-frame denoising processing condition in the at least two images, which may include:

Multi-frame denoising processing of regions other than the motion region in the images satisfying the multi-frame denoising processing condition may be performed by the AP 802.

The mobile terminal shown in FIG. 10 is implemented. The mobile terminal screens images satisfying the multi-frame denoising processing condition by determining whether the acceleration value of the mobile terminal at the capturing time of the at least two images successively captured by the camera is smaller than a preset acceleration threshold. The screening algorithm may be so simple that the images satisfying the multi-frame denoising processing condition can be rapidly and accurately selected.

Figure 11:
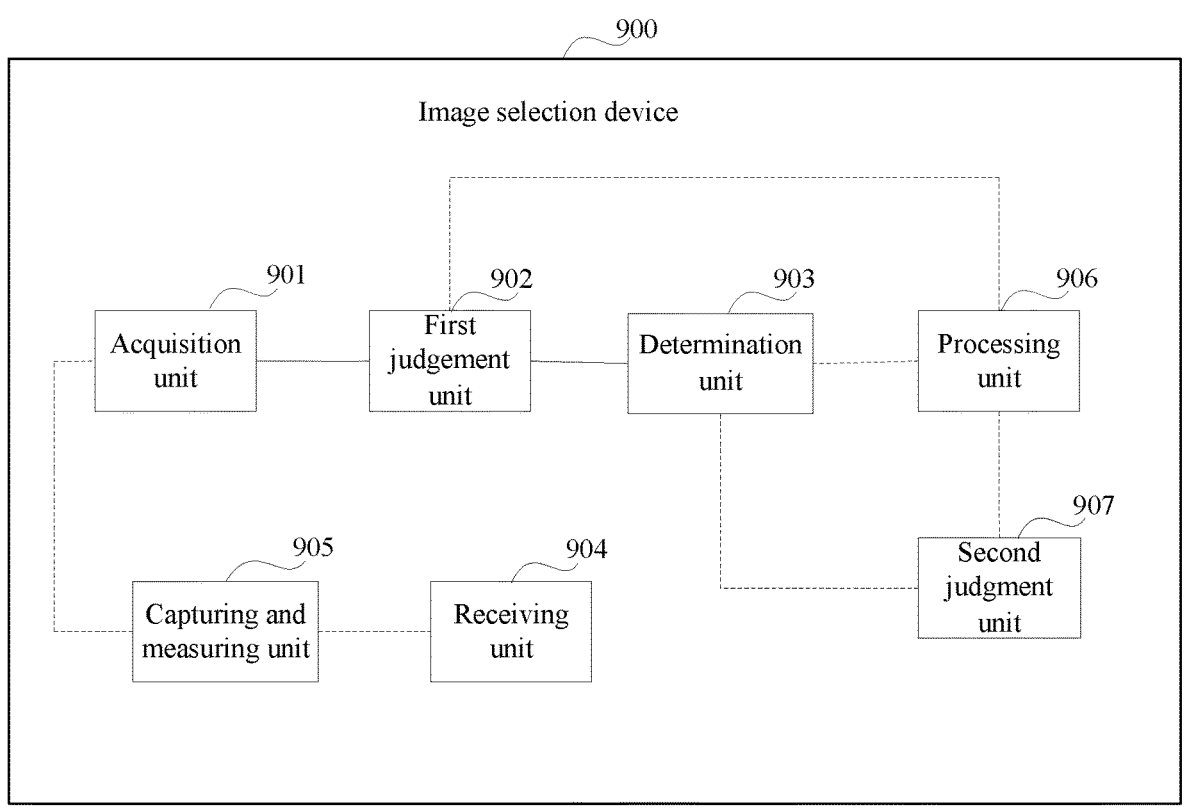
FIG. 11 is a structural diagram of an image selection device according to embodiments of the present disclosure.

Reference is made to FIG. 11, which is a structural diagram of an image selection device according to an embodiment of the present disclosure. As shown in FIG. 11, the image selection device 900, which is applied to a mobile terminal including a camera, may include an acquisition unit 901, a first determining unit 902, and a determination unit 903.

The acquisition unit 901 may be configured to acquire image information of a first image, where the image information of the first image may include a first acceleration value of the mobile terminal in response to the camera capturing the first image, and the first image may be any one of at least two images successively captured by the camera.

The first determining unit 902 may be configured to determine whether the first acceleration value is smaller than a preset acceleration threshold.

The determination unit 903 may be configured to determine that the first image satisfies a multi-frame denoising processing condition in response to the first determining unit 902 determining that the first acceleration value is smaller than the preset acceleration threshold.

Optionally, the image selection device 900 may further include a receiving unit 904 and a capturing and measuring unit 905.

The receiving unit 904 may be configured to receive a successive capturing instruction.

The capturing and measuring unit 905 may be configured to control the camera to successively capture at least two images in response to the successive capturing instruction, and to measure an acceleration value and an acceleration direction of the mobile terminal via a gyroscope in response to the camera successively capturing the at least two images.

Optionally, that the capturing and measuring unit 905 measures the acceleration value and the acceleration direction of the mobile terminal via the gyroscope in response to the camera successively capturing the at least two images may include:

The capturing and measuring unit 905 may measure a first acceleration value and a first acceleration direction of the mobile terminal via the gyroscope in response to the camera capturing the first image.

That the first determining unit 902 determines whether the first acceleration value is smaller than the preset acceleration threshold may include:

The first determining unit 902 may determine whether the first acceleration value may be smaller than a corresponding preset acceleration threshold of the first acceleration direction.

Optionally, the image selection device 900 may further include a processing unit 906.

The processing unit 906 may be further configured to perform multi-frame denoising processing on the images satisfying the multi-frame denoising processing condition in the at least two images.

Optionally, the first determining unit 902 may be further configured to: determine whether the number of images satisfying the multi-frame denoising processing condition in the at least two images reaches a preset number before the processing unit 906 performs multi-frame denoising processing of the images satisfying the multi-frame noise reduction processing condition in the at least two images.

The processing unit 906 may be further configured to: perform multi-frame denoising processing on the images satisfying the multi-frame denoising processing condition in the at least two images in response to the first determining unit 902 determining that the number of images satisfying the multi-frame denoising processing condition in the at least two images reaches the preset number.

Optionally, the image selection device 900 may further include a second determining unit 907.

The second determining unit 907 may be configured to determine whether a same motion region exists in each of the images satisfying the multi-frame denoising processing condition.

In response to the second determining unit 907 determining that a same motion region exists in each of the images satisfying the multi-frame denoising processing condition, that the processing unit 906 performs multi-frame denoising processing on the images satisfying the multi-frame denoising processing condition in the at least two images, which may include:

The processing unit 906 may perform multi-frame denoising processing on regions other than the motion region in the images satisfying the multi-frame denoising processing condition.

The image selection device in FIG. 11 is implemented. The image selection device screens images satisfying the multi-frame denoising processing condition by determining whether the acceleration value of the mobile terminal at the capturing time of the at least two images successively captured by the camera is smaller than a preset acceleration threshold. The screening algorithm may be so simple that the images satisfying the multi-frame denoising processing condition can be rapidly and accurately selected.

Figure 12:
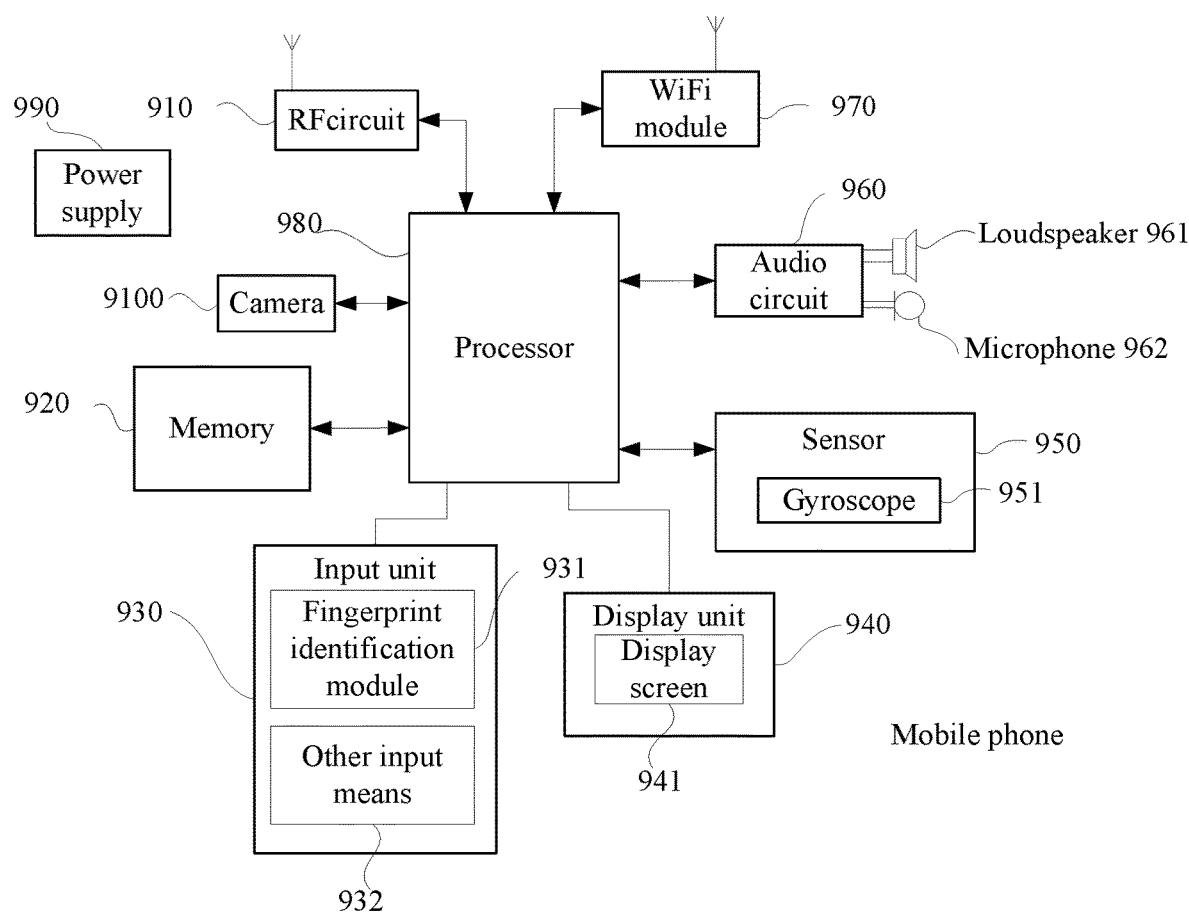
FIG. 12 is a structural diagram of still another mobile terminal according to embodiments of the present disclosure.

Embodiments of the present disclosure further provides another mobile terminal. As shown in FIG. 12, for the convenience of description, only parts related to the embodiment of the present disclosure are shown. As for specific technical details which are not disclosed, reference may be made to the method portions of the embodiment of the present disclosure. The mobile terminal can be any terminal device which includes: a mobile phone, a tablet computer, a PDA (Personal Digital Assistant), a POS (Point of Sales), a vehicle-mounted computer. The mobile terminal may be illustrated by a mobile phone below.

FIG. 12 is a block diagram showing a partial structure of a mobile phone related to a mobile terminal provided by an embodiment of the present disclosure. Referring to FIG. 12, the mobile phone may include: a radio frequency (RF) circuit 910, a memory 920, an input unit 930, a display unit 940, a sensor 950, an audio circuit 960, a wireless fidelity (WiFi) module 970, a processor 980, a power supply 990 and the like. It could be understood by those skilled in the art that, the structure of the mobile phone shown in FIG. 12, which does not constitute a limitation of the mobile phone, may include more or less components than those illustrated, or combine some components, or involve different component arrangements.

The respective components of the mobile phone will be introduced in detail below in conjunction with FIG. 12.

The RF circuit 910 can be configured to receive and send information. Generally, the RF circuit 910 includes, but may be not limited to, an antenna, at least one amplifier, a transceiver, a coupler, a Low Noise Amplifier (LNA), a duplexer, and the like. In addition, the RF circuit 910 can also communicate with the network and other devices via wireless communication. The wireless communication, which may use any communication standard or protocol, includes, but may be not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 920 can be configured to store software programs and modules. The processor 980 may be configured to execute various functional applications and data processing of the mobile phone by running the software programs and modules stored in the memory 920. The memory 920 may mainly include a program storage area and a data storage area. Therein, the program storage area may store an operating system, at least one application required by the functions, and the like; and the data storage area may store data created according to usage of the mobile phone, and the like. Moreover, the memory 920 can include a high-speed random access memory, and can also include a non-volatile memory, such as at least one magnetic disk storage means, flash memory means, or other volatile solid-state storage means.

The input unit 930 can be configured to receive inputted numeric or character information and to generate key signal inputs related to user settings and function controls of the mobile phone. Specifically, the input unit 930 may include a fingerprint identification module 931 and other input means 932. The fingerprint identification module 931 may collect fingerprint data of the user. In addition to the fingerprint identification module 931, the input unit 930 may also include other input means 932. Specifically, the other input means 932 may include, but are not limited to, one or more of a touch screen, a physical keyboard, function keys (such as volume control press-key, on/off press-key, etc.), track-balls, mouse, joystick, and the like.

The display unit 940 can be configured to display information input by the user or information provided to the user and various menus of the mobile phone. The display unit 940 may include a display screen 941. Optionally, the display screen 941 can be configured in the form of a liquid crystal display (LCD), an organic light-emitting diode (OLED), or the like. Although the fingerprint identification module 931 and the display screen 941 are used as two separate components to implement the input and output functions of the mobile phone in FIG. 12, yet in some embodiments, the fingerprint identification module 931 and the display screen 941 may be integrated to implement the input and play functions of the mobile phone.

The mobile phone may further include at least one type of sensor 950, such as an optical sensor, a motion sensor, and other sensors. Specifically, the optical sensor may include an ambient light sensor and a proximity sensor. Therein, the ambient light sensor may adjust luminance of the display screen 941 according to brightness of the ambient light, and the proximity sensor may turn off the display screen 941 and/or back light when the mobile phone moves to the ear. As a type of motion sensor, an accelerometer sensor can detect acceleration magnitudes in all directions (usually three axes). When it is stationary, it can detect the magnitude and direction of gravity, which can be used to identify the posture application of the mobile phone (such as horizontal and vertical screen switching, related games, magnetometer posture calibration), vibration recognition related functions (such as pedometer, tapping), etc. As for other sensors such as gyroscope, barometer, hygrometer, thermometer, infrared sensor, etc., which can be provided on the mobile phone, details are no longer described herein. The sensor 950 can further include a gyroscope 951 for measuring an instantaneous acceleration of the mobile phone.

The audio circuit 960, a loudspeaker 961, and a microphone 962 can provide an audio interface between the user and the mobile phone. The audio circuit 960 can transmit electrical signals derived after conversion of the received audio data to the loudspeaker 961 which converts the electrical signals to sound signals for being played. In another aspect, the microphone 962 converts the collected sound signals into electrical signals received and converted by the audio circuit 960 into audio data which is then processed by the processor 980 and sent to another mobile phone via the RF circuit 910, or which is played to the memory 920 for further processing.

WiFi belongs to a short-range wireless transmission technology. The mobile phone can help the user to receive and send emails, browse web pages, and access streaming media via the WiFi module 970, and it could provide the user with wireless broadband Internet access. Although FIG. 12 shows the WiFi module 970, it could be understood that it does not belong to an indispensable component of the mobile phone, and may be omitted as needed within the scope of not changing the essence of the invention.

The processor 980, as a control center of the mobile phone, connects various components of the entire mobile phone by means of various interfaces and lines, and performs various functions of the mobile phone and processes data by running or executing the software programs and/or modules stored in the memory 920 and calling data stored in the memory 920, thereby achieving overall monitoring of the mobile phone. Optionally, the processor 980 may include one or more processing units. Preferably, the processor 980 may integrate an application processor and a modem processor. Therein, the application processor mainly processes the operating system, the user interface, the application, and the like; and the modem processor mainly processes the wireless communication. It could be understood that the modem processor described above may also not be integrated into the processor 980.

The mobile phone may further include a power supply 990 (such as a battery) that supplies power to various components. Preferably, the power supply can be logically connected to the processor 980 via a power supply management system to implement functions such as charging and discharging management and power consumption management via the power supply management system.

The mobile phone may also include a camera 9100 for capturing images and videos and transmitting the captured images and videos to the processor 980 for processing.

The mobile phone can also include a Bluetooth module, etc., which may be not described herein.

In the foregoing embodiments shown in FIG. 3 to FIG. 7, each method flow may be implemented based on the structure of the mobile phone.

An embodiment of the present disclosure further provides a computer storage medium. Therein, the computer storage medium stores computer programs for electronic data exchange, the computer programs cause a computer to implement some or all of the actions or operations of any image selection method as described in the above method embodiments.

An embodiment of the present disclosure further provides a computer program product comprising a non-transitory computer readable storage medium having stored computer programs thereon, the computer programs are operative to cause a computer to implement some or all of the actions or operations of any image selection method as described in the above method embodiments.

It should be noted that, for the convenience of description, the foregoing method embodiments are expressed as a series of action combinations, but those skilled in the art should understand that the present disclosure may be not limited by the described action sequence, because certain actions or operations may be performed in other sequence or concurrently in accordance with the present disclosure. In addition, those skilled in the art should also understand that the embodiments described in the description all belong to preferred embodiments, and the actions and modules involved therein are not necessarily required by the present disclosure.

In the above embodiments, the descriptions of the various embodiments have different aspects of emphasis, and as for the portions that are not detailed in a certain embodiment, reference may be made to the related descriptions given in other embodiments.

In the several embodiments provided by the present disclosure, it should be understood that the disclosed device can be implemented in other manners. For example, the device embodiments described above are merely illustrative. For example, the division of the units may be only a logical function division. In actual implementation, other division manner may be possible. For example, multiple units or components may be combined or may be integrated into another system, or some features can be ignored or not executed. In addition, the mutual coupling or direct coupling or communication connection shown or discussed can be indirect coupling or communication connection between the devices or units through some interfaces in an electrical or other form.

The units described as separate components may or may not be physically separated, and the components displayed as units may or may not be physical units, that is, may be located in one location, or may be distributed in multiple network units. Some or all of the units thereof may be selected according to actual needs to achieve the purpose of the solution of the present embodiment.

Furthermore, the respective functional units in each embodiment of the present disclosure may be integrated into a processing unit, or may exist physically separately, or two or more units may be integrated into a unit. The above integrated unit can be implemented in the form of hardware or in the form of a software functional unit.

The integrated unit, if implemented in the form of a software functional unit and sold or used as an independent product, may be stored in a computer readable memory. Based on such understanding, essence of the technical solutions of the present disclosure, part of the technical solutions that contributes to the prior art, or all or some of the technical solutions may be embodied in the form of a software product. The computer software product, stored in a memory, includes a number of instructions to cause a computer device (which may be a personal computer, a server or a network device, etc.) to implement all or some of the actions of the method described in each embodiments of the present disclosure. The foregoing memory may include: medium which can store program codes, such as a U disk, a Read-Only Memory (ROM), a Random Access Memory (RAM), a mobile hard disk, a magnetic disk, CD, or the like.

Those ordinarily skilled in the art can understand that, all or some of the actions of the respective methods in the foregoing embodiments can be completed in a manner of instructing related hardware via programs; the programs can be stored in a computer readable memory; and the memory can include: a flash drive, Read-Only Memory short as ROM, Random Access Memory short as RAM, a magnetic disk, CD, or the like.

The embodiments of the present disclosure have been described in detail above. The present disclosure has applied concrete examples to illustrate the principles and implementation modes of the present disclosure. The description of the above embodiments is merely intended to help understand the method of the present disclosure and its core ideas. Meanwhile, those ordinarily skilled in the art may make variations in specific embodiments and application ranges in light of the concept of the present disclosure. In sum, the contents set forth in the present description shall not be construed as limiting the present disclosure.

What is claimed is:

1. A method for image selection applied to a mobile terminal including a camera, and the method comprising:
    acquiring image information of a first image, the image information of the first image comprising a first acceleration value of the mobile terminal in response to the camera capturing the first image, the first image being any one of at least two images successively captured by the camera; and
    determining that the first image satisfies a multi-frame denoising processing condition in response to the first acceleration value being smaller than a preset acceleration threshold;
    determining whether the number of the images satisfying the multi-frame denoising processing condition in the at least two images reaches a preset number; and
    performing multi-frame denoising processing on the images satisfying the multi-frame denoising processing condition in the at least two images, wherein in the performing multi-frame denoising processing on the images satisfying the multi-frame denoising processing condition in the at least two images, the multi-frame denoising processing is performed in response to the number of the images satisfying the multi-frame denoising processing condition in the at least two images reaching the preset number.

2. The method according to claim 1, wherein the mobile terminal further comprises a gyroscope; and
    the method further comprises:
        prior to acquiring the image information of the first image:
            receiving a successive capturing instruction;
            controlling the camera to successively capture the at least two images in response to the successive capturing instruction; and
            measuring, via the gyroscope, an acceleration value and an acceleration direction of the mobile terminal in response to the camera successively capturing the at least two images.

3. The method according to claim 2, wherein the measuring, via the gyroscope, the acceleration value and the acceleration direction of the mobile terminal in response to the camera successively capturing the at least two images, comprises:
    measuring, via the gyroscope, the first acceleration value and a first acceleration direction of the mobile terminal in response to the camera capturing the first image.

4. The method according to claim 1, wherein the method comprises:
    prior to performing the multi-frame denoising processing on the images satisfying the multi-frame denoising processing condition in the at least two images:
        determining whether a same motion region exists in each of the images satisfying the multi-frame denoising processing condition; and
        in response to the same motion region existing in each of the images satisfying the multi-frame denoising processing condition, the performing the multi-frame denoising processing on the images satisfying the multi-frame denoising processing condition in the at least two images comprising:

performing multi-frame denoising processing on regions other than the motion region in the images satisfying the multi-frame denoising processing condition.

5. The method according to claim 3, wherein the preset acceleration thresholds of the different acceleration directions are different.

6. The method according to claim 1, wherein in response to the first acceleration value being determined to be greater than a preset acceleration threshold, the method further comprises:
outputting prompt information.

7. A mobile terminal, comprising: a camera and an application processor (AP), wherein the AP is configured to:
acquire image information of a first image, the image information of the first image comprising a first acceleration value of the mobile terminal in response to the camera capturing the first image, the first image being any one of at least two images successively captured by the camera; and
storing the first image for a multi-frame denoising processing in response to the first acceleration value being smaller than a preset acceleration threshold;
determining whether the number of the stored images reaches a preset number; and
perform multi-frame denoising processing on the stored images when the number of the stored images reaches the preset number;
wherein the AP is further configured to determine whether a same motion region exists in each of the stored images; and
in response to the same motion region existing in each of the stored images, that the PA performs multi-frame denoising processing on the stored images further comprises:
the AP performs multi-frame denoising processing on regions other than the motion region in the images satisfying the multi-frame denoising processing condition.

8. The mobile terminal according to claim 7, wherein the mobile terminal further comprises a gyroscope; wherein
the AP is further configured to receive a successive capturing instruction;
the camera is further configured to successively capture at least two images in response to the successive capturing instruction; and
the gyroscope is further configured to measure an acceleration value and an acceleration direction of the mobile terminal in response to the camera successively capturing the at least two images.

9. The mobile terminal according to claim 8, wherein that the gyroscope measures an acceleration value and an acceleration direction of the mobile terminal in response to the camera successively capturing the at least two images further comprises:
the gyroscope measures the first acceleration value and a first acceleration direction of the mobile terminal in response to the camera capturing the first image.

10. The mobile terminal according to claim 9, wherein the preset acceleration thresholds of different acceleration directions are different.

11. The mobile terminal according to claim 9, wherein the AP is further configured to output prompt information in response to the first acceleration value being greater than a preset acceleration threshold.

12. A non-transitory computer readable storage medium, storing computer programs for electronic data exchange, wherein the computer programs cause a computer to perform operations:
acquiring image information of a first image, the image information of the first image comprising a first acceleration value of the mobile terminal in response to the camera capturing the first image, the first image being any one of at least two images successively captured by a camera;
in response to the first acceleration value being smaller than the preset acceleration threshold and a same motion region existing in each of images satisfying the multi-frame denoising processing condition, performing multi-frame denoising processing on regions other than the motion region in the images satisfying the multi-frame denoising processing condition;
determining whether the number of the images satisfying the multi-frame denoising processing condition in the at least two images reaches a preset number; and
in the performing multi-frame denoising processing on regions other than the motion region in the images satisfying the multi-frame denoising processing condition, the multi-frame denoising processing is performed in response to the number of the images satisfying the multi-frame denoising processing condition in the at least two images reaching the preset number.

13. The non-transitory computer readable storage medium according to claim 12, wherein prior to the acquiring image information of the first image, the operations further comprise:
receiving a successive capturing instruction;
controlling the camera to successively capture the at least two images in response to the successive capturing instruction; and
measuring, via a gyroscope, an acceleration value and an acceleration direction of the mobile terminal in response to the camera successively capturing the at least two images.

14. The non-transitory computer readable storage medium according to claim 13, wherein the measuring, via the gyroscope, the acceleration value and the acceleration direction of the mobile terminal in response to the camera successively capturing the at least two images, comprises:
measuring, via the gyroscope, the first acceleration value and a first acceleration direction of the mobile terminal in response to the camera capturing the first image.

* * * * *